United States Patent [19]
Vann

[11] Patent Number: 5,883,803
[45] Date of Patent: Mar. 16, 1999

[54] SIX DEGREE OF FREEDOM SENSOR

[75] Inventor: Charles S. Vann, Fremont, Calif.

[73] Assignee: The Regents of the University of California, Oakland, Calif.

[21] Appl. No.: 719,061

[22] Filed: Sep. 24, 1996

[51] Int. Cl.$^6$ ................................................ G01B 11/26
[52] U.S. Cl. ............................... 364/167.01; 356/139.03; 356/152.2; 356/152.3
[58] Field of Search ....................... 364/167.01; 356/138, 356/139.03, 139.04, 139.05, 139.06, 139.07, 141.1, 141.2, 141.4, 152.2, 152.1, 152.3, 445–448

[56] References Cited

U.S. PATENT DOCUMENTS

| | | | |
|---|---|---|---|
| 4,364,663 | 12/1982 | Gardner et al. | 356/371 |
| 4,659,933 | 4/1987 | Anthon | 356/448 |
| 4,673,818 | 6/1987 | Guerra | 356/124 |
| 5,241,557 | 8/1993 | Vann | 372/101 |
| 5,367,373 | 11/1994 | Busch-Vishniac et al. | 356/139.03 |

*Primary Examiner*—Reba I. Elmore
*Assistant Examiner*—Thomas E Brown
*Attorney, Agent, or Firm*—John P. Wooldridge

[57] ABSTRACT

This small, non-contact optical sensor increases the capability and flexibility of computer controlled machines by detecting its relative position to a workpiece in all six degrees of freedom (DOF). At a fraction of the cost, it is over 200 times faster and up to 25 times more accurate than competing 3-DOF sensors. Applications range from flexible manufacturing to a 6-DOF mouse for computers. Until now, highly agile and accurate machines have been limited by their inability to adjust to changes in their tasks. By enabling them to sense all six degrees of position, these machines can now adapt to new and complicated tasks without human intervention or delay—simplifying production, reducing costs, and enhancing the value and capability of flexible manufacturing.

6 Claims, 2 Drawing Sheets

SIX DEGREE OF FREEDOM SENSOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to computer controlled machines, and more specifically, it relates to a small, non-contact optical sensor that increases the capability and flexibility of computer controlled machines by detecting its relative position to a workpiece in all six degrees of freedom.

2. Description of Related Art

In today's flexible manufacturing operations, much time and money are wasted when changes have to be made in the manufacturing process. For example, if a minor modification is made to the shape of a car door and a robot is used to weld that door, the robot must be "taught" the new shape by an operator. That is, the operator must guide the robot tool by hand through each motion and every orientation in the welding operation. Besides being time consuming, this process is often inaccurate. It is also expensive because this is down time for both the robot and the operator. Furthermore, every part must be positioned exactly where the robot expects it to be, requiring the use of expensive sensors and positioning devices.

Many companies make non-contact laser sensors. Most are one dimensional (1D) range detectors, a few construct a 3D profile of an object, but the object must move through its laser beam. By scanning a laser beam, a laser range camera can detect all 3 positions of a stationary object, and even though it does not detect orientation, it appears to be SixDOF's closest competitor. Laser coordinate measuring systems (laser trackers) also detect three positions of a stationary object, but, made for large work volumes, they are too big (>1 ft$^3$) and too expensive (~$140,000) to mount on a robot or machine head.

SUMMARY OF THE INVENTION

It is an object of the present invention to provide a six degree of freedom sensor.

The present invention is a small, inexpensive, non-contact six degree of freedom (SixDOF) sensor that substantially increases the capability and flexibility of computer controlled machines. Until now, highly agile and accurate machines have been limited by their inability to adjust to changes in their tasks. By enabling them to sense all six degrees of position, these machines can now adapt to new and complicated tasks without human intervention or delay, thereby simplifying production, reducing costs, and enhancing the value and capability of flexible manufacturing.

The SixDOF sensor attaches to a computer controlled machine and enables the sensing of all six degrees of freedom (DOF) relative to a workpiece. It accomplishes this by emitting a laser beam and detecting the reflection off references mounted on the part. Inside the sensor, the beam is split and directed onto three photo diodes. The analog signals from the diodes are digitized and fed into a computer which can instruct corrective action for a machine or output position readings.

The sensor includes five assemblies: the laser illuminator, optics, lateral effect photo diodes, signal processing electronics, and a computer. All but the signal processing electronics and computer are located inside the sensor head. The laser source may be a diode laser with its power source located with the signal processing electronics. Two small mirrors guide the beam to the primary optical axis of the sensor. The beam is passed through two negative lenses which diverge the beam. The beam divergence, depth of field, and spot size can be changed by choosing different negative lenses.

Two reflective references are mounted on non-reflective tape and applied to the workpiece. The laser light reflects off the references and back into the sensor. Because the beam is diverging, the reflections are magnified in area when the light returns to the sensor, allowing most of the light to go around the small negative lenses and through a larger collimating lens instead. After collimation, the beam continues through a notch filter which passes the laser light but blocks light at other wavelengths. Inside the sensor, light from a first reflective reference (a dot) is divided into two beams by a beam splitter. Half of the beam is reflected 90 degrees into a lateral effect photo diode. The other half of the beam passes through the beam splitter, into a focusing lens, reflects off two mirrors, and illuminates another photo diode. The light from a second reflective reference (a bar) also passes through the filter. However, because the reflective bar is tilted relative to the dot, the laser light that reflects from it passes through a different location of the filter, missing the collimating lens and beam splitter and reflecting off an adjacent mirror instead. This mirror directs the light onto another photo diode.

Each of the three photo diodes has different sensitivity to the relative position of the sensor and the reflectors, permitting any change in position in any of the six degrees of freedom to be delineated when decoupled in software. One photo diode is the most sensitive to translation between the bar and the sensor and the rotation of the sensor about the axis normal to the surface of the dot. In contrast, a second photo diode is most sensitive to tilt about the X and Y axis. A third diode is sensitive to lateral translation of the sensor relative to the reference dot.

The signals from the three photo diodes are processed by electronics remotely located from the sensor head. The analog data from the diodes are digitized with an Analog to Digital converter and fed into a computer. Once in software, the data is decoupled into six independent axes of information. The processed data is then available to the operator for recording or sending commands to change the position of a computer controlled machine.

DETAILED DESCRIPTION OF THE INVENTION

The SixDOF sensor attaches to a computer controlled machine and enables the sensing of all six degrees of freedom (DOF) relative to a workpiece. It accomplishes this by emitting a laser beam and detecting the reflection off references mounted on the part. Inside the sensor, the beam is split and directed onto three photo diodes. The analog signals from the diodes are digitized and fed into a computer which can instruct corrective action for a machine or output position readings.

Figure 1:
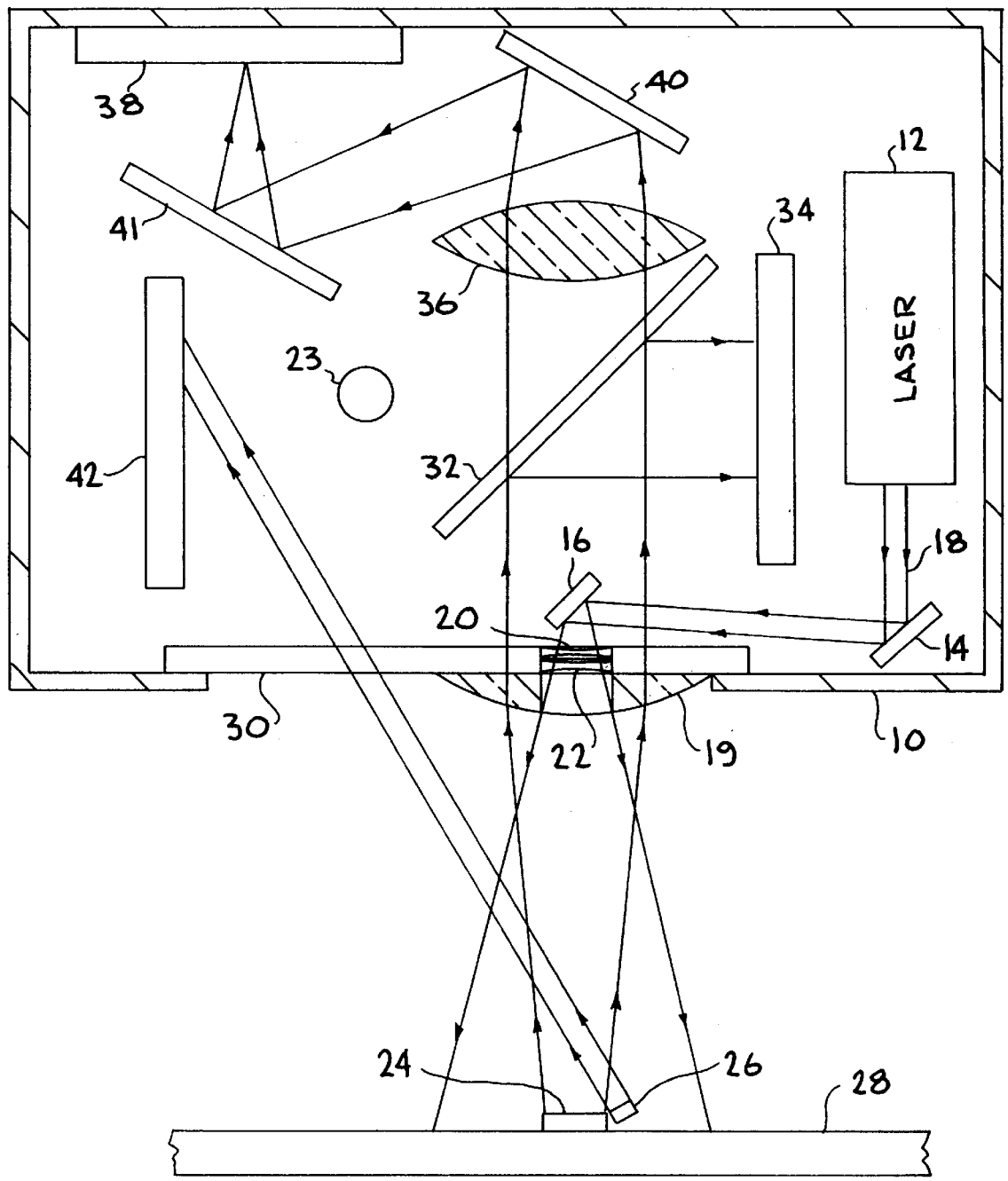
FIG. 1 shows the optical set-up of an embodiment of the present invention.

The sensor includes five assemblies: the laser illuminator, optics, lateral effect photo diodes, signal processing electronics, and a computer. Referring to FIG. 1, all but the signal processing electronics are located in the sensor head 10. The laser source 12 may be a 5 mW diode laser with its 3 Volt power source located with the signal processing electronics. Two small mirrors 14, 16 guide the 1 mm diameter beam 18 to the primary optical axis of the sensor. The beam is passed through two negative lenses (20 and 22) which diverge the beam at a rate of ~0.3 radians (half angle). This high divergence creates a 1 cm diameter laser spot at about 3.5 cm from the face of the sensor. The sensor's field of view can be changed by choosing different negative lenses 20, 22 which in turn change the divergence angle and spot size at a given distance.

Two reflective references, e.g., a 4 mm diameter dot 24 and a 1×1 mm bar 26, are mounted on non-reflective tape and applied to the workpiece 28. The laser light reflects off the references and back into the sensor. Because the beam is diverging, the reflections are magnified in area when the light returns to the sensor, allowing most of the light to go around the small negative lenses and through a relatively large positive lens instead. Lens 19 has a hole in its center to pass the outgoing beam 18, but has a focal length which collimates the diverging reflection beam. In other words, the positive focal length off lens 19 is the same as the negative focal length of the lenses 20 and 22 ty bending the diverging rays of reflected light from the dot 24 to enter the sensor in parallel when the dot is located around half that focal length from the sensor. As the collimated reflection beam continues to propagate into the sensor it passes a band pass filter 30. The filter 30 passes the laser light but blocks light at other wavelengths. Inside the sensor, light from the dot 24 is divided into two beams by a beam splitter 32. Half of the beam is reflected 90 degrees into lateral effect photo diode 34. The other half of the beam passes through the beam splitter, into a positive lens 36, off mirrors 40 and 41, and onto another photo diode 38.

The light from bar 26 also passes through the filter 30. However, because reflective bar 26 is tilted relative to the dot, the laser light that reflects from it is at a greater angle of divergence. The greater angle of reflection causes the light to pass through a different location of the filter 30, missing lens 19 and the beam splitter and illuminating photo diode. To reduce the sensor's sensitivity to external light sources other than the laser, a light emitting diode 23 may be installed inside the sensor to provide controlled background light.

Figure 2:
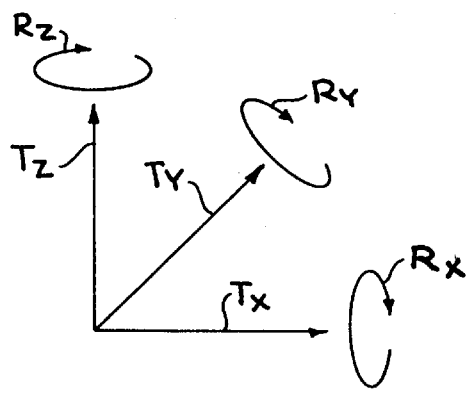
FIG. 2 shows a three dimensional coordinate system of the six degrees of freedom.

Each of the three photo diodes (34, 38 and 42) has different sensitivity to the relative position of the sensor and the reflectors (24 and 26), permitting any change in position in any of the six degrees of freedom to be delineated when decoupling in software. Referring to both FIGS. 1 and 2, photo diode 42 is the most sensitive to translation between the bar 26 and the sensor (Tz) and the rotation of the sensor about the axis normal to the surface (Rz) of dot 24. The bar 26 is tilted such that its reflection illuminates the center of photo diode 42 if, and only if, the sensor is at a prescribed stand-off distance from the bar 26 (half the focal length of 19). Therefore, any up-down deviation of the bar's reflection from the center of photo diode 42 can be calculated as a distance of the sensor from the bar (Tz). Likewise, the radial location of the bar relative to the center of the dot is used as a reference for rotation about Rz. Consequently, any right-left deviation of the bar's reflection from the center of photo diode 42 can be calculated as rotation of the sensor about the normal axis of the dot (Rz).

In contrast, photo diode 38 is most sensitive to tilt about the X and Y axis (Rx, Ry) as explained below. Because the laser beam is diverging as it strikes the reflective reference dot 24, the reflected beam returns larger but on center with the negative lenses 14, 16 even when the sensor is tilted about the negative lenses, i.e., the return light enters the sensor perpendicular to the surface of the reference dot, regardless of sensor tilt. Although the light returns as before the tilt, the position of photo diode 38 does change with tilt of the sensor. Consequently, during tilt, motion of photo diode 38 relative to an unchanged focus of the reflected light provides sensitivity to tilt about the X and Y axis (Rx, Ry). Because of the nature of lenses, diode 38 is not sensitive to pure translations of the reflector 24 because a lens focuses all parallel rays passing through it to the same point, regardless of where the ray comes from, i.e., regardless of where the dot is translated.

In the case of photo diode 34, the beam splitter 32 reflects the light onto it without a lens in the path. Consequently, unlike diode 38, diode 34 is sensitive to lateral translation of the sensor relative to the reference dot (Tx, Ty). Photo diode 34 is also sensitive to tilt; however, this effect can be canceled in software using information from photo diode 38. Likewise, any coupling of photo diodes 42 with the other two photo diodes can be canceled in software.

The signals from the three photo diodes are processed by electronics remotely located from the sensor head. The analog data from the diodes are digitized with an Analog to Digital converter and fed into a computer as six columns of continuously updated voltage readings, two channel from each of the three photo diodes. In this form, the data does not represent pure motions about the six axes because all but two of the channels have information on more than one motion, i.e. the channels are coupled. Fortunately, the information can be decoupled into pure measurements of motion about all six degrees of freedom. This decoupling is possible because each photo diode provides different information. Photo diode 38 is sensitive only to tilt about the X and Y axis (Rx and Ry). Therefore, the voltage readings from these channels represent pure tilt in those axes without sensitivity (coupling) to other motions. In contrast, photo diode 34 is sensitive to four axes of motion, rotation and translation about X and Y (Tx, Ty, Rx & Ry). However, by subtracting any voltage reading from the photo diode 38, the tilt sensitivity of photo diode 34 is negated, and the remaining voltage is representative of only translation about X and Y (Tx, Ty). Likewise, photo diode 42 is sensitive to all six degrees of freedom. But, by subtracting the voltage from the other two photo diodes, the remaining voltage is representative of only rotation and translation about the Z axis (Tz, Rz).

After all six channels are decoupled, the data can be displayed to an operator or used to send motor commands to a computer controlled machine.

Figure 3:
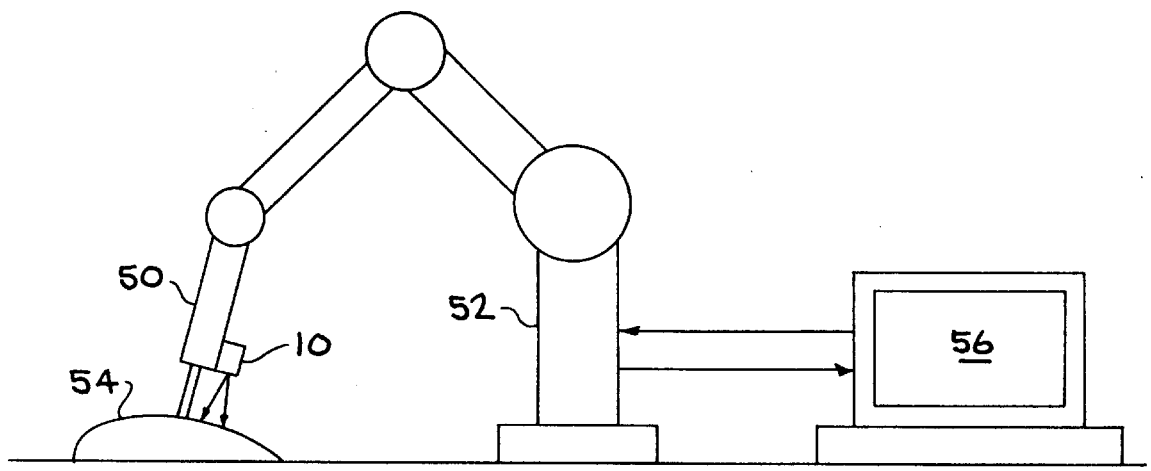
FIG. 3 shows the use of the present invention to guide a laser welder.

FIG. 3 shows the SixDOF sensor 10 located on the tool head 50 of a multi-axis manipulator robot 52 for tracking reflective references on the workpiece 54. Once the robot 52 knows where it is relative to the part 54, the computer 56 can instruct the machine to follow a 6-DOF path pre-described in multi-dimensional computer drawings of the part, or it can be programmed to follow a path of references mounted on the part. Either way, the robot 52 autonomously follows the path, performing its machining task, even if the path is significantly different from its last operation.

The Six DOF sensor provides the following advantages.

(1) The Six DOF sensor eliminates the need for machine "training." With a SixDOF sensor and 3D information on the part, the robot's path and tool orientation can be written in software and any changes to the process can be made by downloading new software, avoiding the need for "training" by an operator.

(2) The Six DOF sensor enables process changes without halting production. Since software can be downloaded quickly into a robot's controller, production is not delayed.

(3) It avoids the need for precise positioning of parts in the workplace. As long as the reflective references come into the sensor's field of view, the sensor can determine its relative position. Since its field of view is many millimeters, typical placement accuracy can be substantially relaxed.

(4) The Six DOF sensor is capable of tracking all 6 degrees of freedom. Some manufacturing operations require 6-DOF information during the process. For example, welding requires 3-DOF of information to locate the weld and three additional DOF to properly orient the tool relative to the part.

(5) It is accurate. Because the laser beam diverges, reflections from the references are magnified on the photo diodes, increasing accuracy. This benefit, combined with high-resolution A to D converters provides micron accuracy in detecting translation and milliradian accuracy in detecting orientation. With different optics, field of view can be reduced to improve accuracy and visa versa.

(6) It is small and easily mounted to a machine. At less than 76 cm$^3$ and 87 grams, the SixDOF sensor can be easily mounted on the head of a manufacturing machine without interfering in its operation.

(7) The Six DOF sensor maintains track, even for very fast moving processes. Analog data can be digitized very fast, e.g. 300 K samples/second A to D converters are available. Therefore, the distance that the target moves between position updates is small, enabling a fast robot to track a fast target.

(8) It is inexpensive. All components of the SixDOF sensor are commercially mass-produced items, providing the benefits of availability and low cost.

(9) It uses standard machine instruction software. As common in the manufacturing industry, machine path instructions can be generated in software directly from computer drawings of the part. This direct transfer of information is efficient, cost effective, and minimizes errors.

(10) The Six DOF sensor is easy to set up. The references, mounted on tape, conform to the contour of the part, so positioning the reflective references on the part is only a 3-DOF task (Tx, Ty, Rz) that can easily be performed by an operator or a simple 3-axis computer controlled machine.

(11) It is non-contact and non-surface dependent As an optical sensor, it does not physically contact, and therefore does not damage, the part in any way. Furthermore, the sensor only illuminates the tape and references, so the characteristics of the part's surface are unimportant.

The SixDOF sensor is the only production sensor capable of determining all six degrees of freedom relative to another object. The competitors' sensors are capable of detecting only three degrees of position or less. This additional information enables flexible automation of complex tasks which now can only be performed manually or after extensive machine training by a human operator. Consequently, robots or other computer controlled machines, which were until now under-utilized, can perform six axis tasks, autonomously. With smarter robots, a change in manufacturing specifications no longer causes costly production delays, and customer's needs can more readily be accommodated.

The SixDOF sensor uses lateral-effect photo diodes rather than a camera. Since photo diodes are smaller than a camera, the SixDOF sensor is about one fifth the size and one fourth the weight of the competitor's package. Yet, for an equivalent field of view, it is 277 times faster and up to 25 times more accurate. This is primarily because these photo diodes generate only six channels of analog output than can be digitized and fed into a computer at very fast rates. For example, a Maxim 12 bit A to D converter which, to date, costs less than $10, samples eight channels at a rate of 16,625 ksps/channel, and divides the signal into 1024 pieces (10 bits usable). This is compared to the competitor's camera system which is limited in resolution by the number of pixels (256×256) and limited in speed by the massive amount of information to digitize (8 bit digitization of each pixel generates over 16 Megabits of information per image).

The cost of a SixDOF sensor is six times less than the camera system, $5000 versus $30,000. This is mainly because the competitor's camera system not only requires a camera but a video image grabber and expensive camera cooling hardware. In contrast, photo diodes are extremely simple and inexpensive when purchased in large quantities (~$20). Furthermore, the laser power required is less (5 mW versus 30 mW) because the SixDOF sensor's laser beam reflects off highly reflective references on the part. While applying the references is an additional step, it makes the SixDOF sensor independent of the part's surface characteristics, permitting lower and less expensive laser power to operate on parts with diffuse surfaces.

The SixDOF sensor enables a computer controlled machine to adjust to changes in manufacturing operations without teaching and without exact positioning of the part. Attached to the tool head of a multi-axis manipulator, the SixDOF sensor tracks reflective references. With the machine knowing all 6-DOF of its relative position and orientation to a part, multi-dimensional computer drawings can be used to guide the machine through complex 6-DOF positioning of the manipulator tool. Therefore, many types of manufacturing operations can be autonomously performed such as welding, milling, deburring, inspection, etc.

This sensor can be used in a wide variety of applications. Generally this sensor could be used in any task that uses computer controlled machines, such as the following.

(1) Parts can be assembled by sensing their relative alignment and correcting the difference. For example, reflective references could be placed on an aircraft fuselage, and the SixDOF sensor mounted on a wing so that the sensor could detect any misalignment as the two large parts are assembled.

(2) The contour of parts can be inspected or mapped relative to a known reference. The reference reflectors can be placed on key locations of a part with the SixDOF sensor making comparisons in all 6-DOF to reference points and/or each of the other points.

(3) An object can be guided relative to a reference platform. With reflective references located on a moving target, a SixDOF sensor located on a fixed reference platform could detect if the object was deviating from a desired path and provide guidance on how to bring the object back on line. The target could be tracked from centimeters or thousands of kilometers from the sensor.

(4) A 6-DOF cursor can be controlled for personal computers. The sensor would be mounted inside a rolling hand support that permits the user to translate, tilt, and rotate the sensor about reflective references mounted underneath it. With 6-DOF control, plus push buttons, the user could perform much more complicated real-time tasks than now possible with a typical 2-DOF mouse.

(5) Muscle recovery can be diagnosed. To evaluate the effect of physical therapy, doctors need to know how a patient's muscles move during exercise. By following reflective references mounted on the patient's injured limb, a robot with a SixDOF sensor can generate a 6-DOF mapping of muscle motions.

(6) Dangerous tasks can be remotely performed. The sensor enables remote manipulation of radioactive, toxic, or explosive materials. For example, a robot with a SixDOF sensor could track reflective references mounted on an operator's hands while he disassembles a dummy bomb, and another robot, electronically slaved to the motions of the first robot, would disassemble the real one.

The SixDOF sensor is an enabling technology that should have significant impact on flexible automation. Many of its future applications are not yet identified.

Changes and modifications in the specifically described embodiments can be carried out without departing from the scope of the invention, which is intended to be limited by the scope of the appended claims.

I claim:

1. A six degree of freedom sensor, comprising:

a reflective bar;

a reflective dot, wherein said reflective bar is tilted with respect to said reflective dot;

wherein said reflective bar and reflective dot are attached to a workpiece;

means for producing a light beam for simultaneously illuminating said reflective bar and said reflective dot;

means for diverging said light beam;

a beamsplitter for splitting light reflected from said reflective dot to produce a first reflected beam and a second transmitted beam;

a first photodiode for detecting said first beam;

a second photodiode for detecting said second beam;

a lens to focus said second beam onto said first photodiode;

a third photodiode for detecting light reflected from said reflective bar;

a digitizer for digitizing the signals from said first, second and third photo diode; and a computer comprising a computer program for multiplying the digitized signals by a calibration matrix to produce matrix data, wherein said computer program decouples said matrix data into discrete position information in all six degrees of freedom.

2. A six degree of freedom sensor, comprising:

a reflective bar;

a reflective dot, wherein said reflective bar is tilted with respect to said reflective dot;

wherein said reflective bar and reflective dot are adjacent and are attached to a workpiece;

a light source comprising a light beam for simultaneously illuminating said reflective bar and said reflective dot means for diverging said light beam;

a beamsplitter for splitting light reflected from said reflective dot to produce a first reflected beam and a second transmitted beam;

a first photo diode for detecting said first beam;

a second photo diode for detecting said second beam;

a lens to focus said second beam onto said second photo diode;

a third photo diode for detecting light reflected from said reflective bar;

a laser emitting diode for providing background light on said first photo diode, said second photo diode and said third photo diode;

a signal processing unit to condition and amplify signals from the photo diodes;

a digitizer for digitizing the signals from said first, second and third photo diode; and a computer comprising a computer program for multiplying the digitized signals by a calibration matrix to produce matrix data, wherein said computer program decouples said matrix data into discrete position information in all six degrees of freedom.

3. A six degree of freedom sensor, comprising:

means for reflecting laser light from a part to produce reflected light, wherein said part comprises six degrees of freedom, comprising Tz, Rz, Ty, Ry, Tx and Rx;

means for directing said reflected light onto three photodiodes, wherein a first photodiode of said three photodiodes is sensitive to translation between said part and said sensor (Tz) and rotation of said part (Rz), wherein a second photodiode of said three photodiodes is sensitive to tilt about Rx and Ry and wherein a third photodiode of said three photodiodes is sensitive to translation of said part in the Tx and Ty directions; and means for determining the position of Tz, Rz, Ty, Ry, Tx and Rx of said part from light detected by said three photodiodes.

4. A sensor, comprising:

a reflective dot;

wherein said reflective dot is adhesively attached, made into, or painted onto to a part;

a light source to produce a light beam for illuminating said reflective dot, wherein said light source is selected from a group consisting of a light emitting diode (LED) and a laser light source;

means for diverging said light beam;

a beamsplitter for splitting light reflected from said reflective dot to produce a first reflected beam and a second transmitted beam;

a first photodiode for detecting said first beam;

a second photo diode for detecting said second beam;

a lens to focus said second beam onto said second photodiode;

a laser emitting diode for providing background light on said first photo diode and said second photo diode;

a signal processing unit to condition and amplify signals from the photo diodes;

a digitizer for digitizing the signals from said first and second photo diode; and a computer comprising a computer program for multiplying the digitized signals by a calibration matrix to decouple the data into unambiguous position information in four degrees of freedom.

5. A six degree of freedom sensor, comprising:

a first light source fixedly attached to an object of interest, wherein said first light source provides a first beam of light for illuminating said sensor;

a beamsplitter for splitting said light from said light source to produce a first reflected beam and a second transmitted beam;

a first photodiode for detecting said first beam;

a second photo diode for detecting said second beam;

a lens to focus said second beam onto said second photodiode;

a second light source on said object of interest, wherein said second light source provides a second beam of light for illuminating said sensor;

a third photo diode for detecting said second beam of light from said second light source;

a laser emitting diode for providing background light on said first photo diode, said second photo diode and said third photo diode;

a signal processing unit to condition and amplify signals from the photo diodes;

a digitizer for digitizing the signals from said first, second and third photo diode; and a computer comprising a computer program for multiplying the digitized signals by a calibration matrix to decouple the data into unambiguous position information in all six degrees of freedom.

6. A six degree of freedom sensor, comprising:

a reflective bar;

a reflective dot, wherein said reflective bar is tilted with respect to said reflective dot;

wherein said reflective bar and reflective dot are adjacent and are attached to a workpiece;

a light source comprising a light beam for simultaneously illuminating said reflective bar and said reflective dot;

a fiber optic to transport and diverge said light beam from said light source;

a lens to collimate the diverging beam reflected from said reflective dot;

a beamsplitter for splitting light reflected from said reflective dot to produce a first reflected beam and a second transmitted beam;

a first photo diode for detecting said first beam;

a second photo diode for detecting said second beam;

a lens to focus said second beam onto said second photo diode;

a third photo diode for detecting light reflected from said reflective bar;

a laser emitting diode for providing background light on said first photo diode, said second photo diode and said third photo diode;

a signal processing unit to condition and amplify signals from the photo diodes;

a digitizer for digitizing the signals from said first, second and third photo diode; and a computer comprising a computer program for multiplying the digitized signals by a calibration matrix to produce matrix data, wherein said computer program decouples said matrix data into discrete position information in all six degrees of freedom.

* * * * *